April 4, 1967   W. C. CONROY   3,311,937
METHOD OF MAKING A SCUFF TYPE SLIPPER
Filed March 3, 1966

William C Conroy
INVENTOR.
BY Ralph Hammar
Attorney

United States Patent Office 3,311,937
Patented Apr. 4, 1967

3,311,937
METHOD OF MAKING A SCUFF TYPE SLIPPER
William C. Conroy, 503 Marshall Drive, Erie, Pa. 16505
Filed Mar. 3, 1966, Ser. No. 531,513
1 Claim. (Cl. 12—142)

This invention is in a method of making a one-use, scuff type slipper of the type supplied for locker rooms, motels, and the like.

Figure 1:
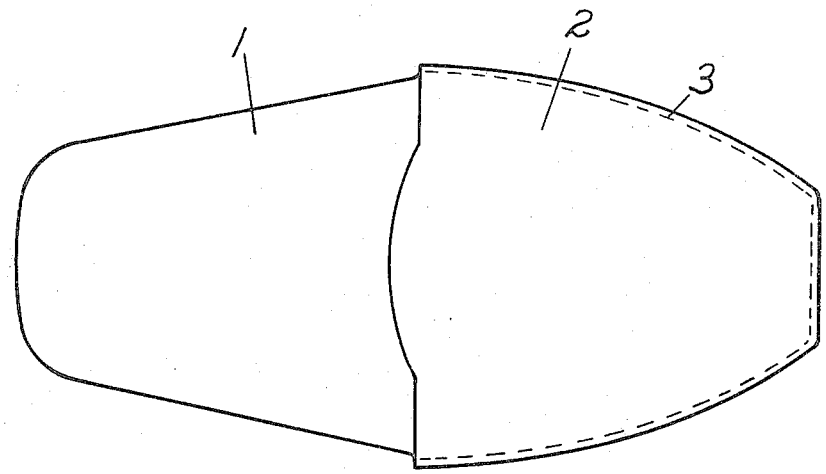
Figure 2:
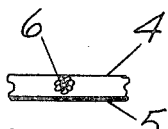

In the drawing, FIG. 1 is a plan view of a slipper, and FIG. 2 is an enlarged fragmentary section.

The slipper comprises a sole 1 and a vamp 2 secured to the periphery of the sole by a joint 3 such as stitching or adhesive. The parts so far described are or may be of common construction and may differ substantially in appearance from those illustrated.

Both the sole and vamp are made of a sheet of flexible, closed cell, extruded polystyrene foam film. Polystyrene foam is a material used in panel form for heat insulation. When extruded in the form of thin film, the heat and pressure used in extrusion result in imperforate upper and lower surface skins 4 and 5 which are of satin finish or texture and have the characteristic of being water repellent. Drops of water collect on the skins in the same manner as drops of mercury on a solid surface. Between the skins 4 and 5 the body of the film consists of microscopic, closed cells fused to each other, a few of which are indicated at 6. The fusion of the closed cells to each other prevents absorption of water by capillary action through breaks in the skins. The water repellent properties of the skins prevent good thermal contact which imparts a warm feeling and makes the slippers more comfortable on cold bathroom floors. Although the polystyrene foam has good heat insulating properties ($k$-value of approximately .24) the surface characteristics of the skins 4, 5 are important in increasing the comfort to the wearer. The thickness of the polystyrene film is nominally 10±5 mils (substantially 10 mils in the claim) and the density of the film is nominally 7±2 pounds (substantially 7 pounds in the claim) per cubic foot. Because the slippers are intended for one time use, thin films are preferred because of lower cost. Films thicker than 15 mils increase the cost without corresponding advantage. Films thinner than 5 mils are subject to the criticism of insufficient mechanical strength. The cost of the polystyrene foam film is competitive with paper and the warm, satin surface and water repellent properties make the slipper much more comfortable to wear.

The heat insulation of the film is such that heat sealing is not practical for the joint 3 between the vamp and sole.

In use, the toes are inserted between the sole 1 and vamp 2 in the usual manner.

What is claimed as new is:

The method of making a one-use, scuff type slipper comprising a sole and a vamp secured to the periphery of the sole which comprises the steps of forming separate sole and vamp portions from a flexible, closed cell, extruded polystyrene film sheet substantially 10 mils thick and of density substantially 7 pounds per cubic foot and having smooth, imperforate, water repellent, upper and lower skins, and attaching outer edge portions of the vamp to outer edge portions of the sole.

References Cited by the Examiner
UNITED STATES PATENTS

| | | | |
|---|---|---|---|
| 2,614,341 | 10/1952 | Abbott | 36—11.5 |
| 2,797,731 | 7/1957 | Carlson. | |
| 2,857,625 | 10/1957 | Carlson. | |
| 2,945,261 | 7/1960 | Aykanian et al. | |
| 2,971,278 | 2/1961 | Scholl. | |
| 2,998,501 | 8/1961 | Edberg. | |
| 3,221,422 | 12/1965 | Lemeshnik. | |

PATRICK D. LAWSON, *Primary Examiner.*